United States Patent [19]

Hui

[11] Patent Number: 4,918,689
[45] Date of Patent: Apr. 17, 1990

[54] ASYNCHRONOUS COMMUNICATION SYSTEM

[75] Inventor: Yu N. Hui, North Plainfield, N.J.

[73] Assignee: Bell Communications Research, Inc., Livingston, N.J.

[21] Appl. No.: 257,428

[22] Filed: Oct. 13, 1988

Related U.S. Application Data

[63] Continuation of Ser. No. 786,219, Oct. 10, 1985, abandoned.

[51] Int. Cl.$^4$ ............................................. H04J 3/02
[52] U.S. Cl. ..................................... 370/85.9; 370/4; 370/10; 370/11; 375/23; 375/38
[58] Field of Search ..................... 370/10, 11, 88, 118, 370/85, 4, 85.9, 85.12; 375/23, 38; 380/33, 34; 455/600, 606, 607; 350/96.15, 96.16, 96.24

[56] References Cited

U.S. PATENT DOCUMENTS

| | | | |
|---|---|---|---|
| 3,704,070 | 11/1972 | Johnson et al. | 356/152 |
| 3,799,675 | 3/1974 | Johnson et al. | 356/152 |
| 4,041,453 | 8/1977 | Umeda et al. | 375/38 |
| 4,070,550 | 1/1978 | Miller, Jr. et al. | 179/15 |
| 4,201,909 | 5/1980 | Dogliotti et al. | 455/608 |
| 4,231,031 | 10/1980 | Crowther et al. | 340/695 |
| 4,309,703 | 1/1982 | Blahut | 343/17.2 |
| 4,733,093 | 3/1988 | Graves et al. | 455/606 |

FOREIGN PATENT DOCUMENTS 638068 8/1983 Switzerland .

OTHER PUBLICATIONS

"Address-Code Methods for Communication Transmission Systems", News from the Research Institute of AEG-Telefunken, Ulm, by Wolfgang Herzig.
Bull. of Swiss Electrotech. Society, "Address-organized Transmission Methods for Mobile Radio Systems", Report, presented at the 32nd High Frequency Meeting of SEV on Jan. 29, 1970 in Lausanne, by H. Steinmann, Bern.
646 Archives for Electronics and Transmission Technology, K. D. Schenkel: Integrated Digital Communication System, Announcement from the Research Institute of AEG-Telefunken, Ulm, (Donau).
"Coding and Decoding for Code Division Multiple User Communication Systems", *IEEE Transactions on Communications*, Timothy J. Healy—vol. COM-33, No. 4, Apr. 1985, pp. 310-31.
"Communication Protocols for a Spread Spectrum Local Area Network", *FOC/LAN* 84—C. I. Spracklen and C. Smythe, pp. 70-74.
"Microbend Optical Fiber Tapped Delay Line for Gigahertz Signal Processing", K. P. Jackson, J. E. Bowers, S. A. Newton and C. C. Cutler, *Appl. Phys. Lett.*—vol. 41, No. 2, Jul. 1982, pp. 139-141.

Primary Examiner—Douglas W. Olms
Assistant Examiner—Wellington Chin
Attorney, Agent, or Firm—James W. Falk; John T. Peoples

[57] ABSTRACT

Methodology, and associated circuitry, for encoding and decoding signals utilize combined time-signal path diversity techniques that trade-off bandwidth for autonomy of communications and simplified signal processing, thereby improving reliability.

Transmitter (800) processes an incoming data stream by partitioning the stream into contiguous blocks. Each block is encoded into a data frame for transmission over one or more paths comprising the medium interconnecting the transmitter and receiver. Frame encoding is effected by generating an array of pulses distributed in time as well as distributed across the paths.

Receiver (100) is generally arranged as a correlation detector in that the receiver only responds to the particular time-signal path pattern for which it is configured. Sensors in energy transfer relation to the one or more paths are positioned at detection points on the paths in correspondence to the time-space pattern of the receiver. The outputs of the sensors are processed to produce a correlation signal at the given frame rate whenever the coded signal corresponding to the receiver configuration is propagating along the paths.

16 Claims, 6 Drawing Sheets

ASYNCHRONOUS COMMUNICATION SYSTEM

This is continuation of application Ser. No. 786,219, filed Oct. 10, 1985, now abandoned.

TECHNICAL FIELD OF THE INVENTION

This invention relates generally to a communication system having numerous transmitter-receiver combinations connected to common transmission media and, more particularly, to electro-optical circuitry and methodology for effecting encoding-decoding over the system using space-time diversity coding techniques.

BACKGROUND OF THE INVENTION

A local area network (LAN) is a communication network, limited in geographic scope from several meters to several kilometers, that links end-users generally requiring integrated (data/voice/video) services. Satisfying the growing demand for services with conventional LANs is becoming increasingly more difficult because of the restricted communication capacity available on these LANs. For example, LANs operating at speeds up to 10 megabit/sec. are common for interconnecting terminals, intelligent workstations and personal computers to a large host. Even some LANs operating at 50 megabit/sec. are available for interconnecting small numbers of large hosts. However, these speeds are inadequate for a large business with hundreds of employees and numerous host machines and communication needs for facsimile, high resolution graphics and video requiring up to 1 gigabit/sec. transmission capability.

Part of this inadequacy occurs because some network processes, such as switching and transceiving, are performed electronically even when the transmission medium is a fiber optic cable. The speed of electronic processing is substantially slower than the speed of optical processing. In effect, the network processing is not a suitable match to fiber transmission medium.

Another factor impacting communication speed is that signal propagation time for a high speed system is significant when compared to the duration of a packet of information, thereby complicating network synchronization and scheduling.

Recent activity culminating in the development of high bandwidth optical communication components introduces a new perspective not previously encountered with conventional networking, particularly as related to LANs. For instance, bandwidth is virtually unlimited because of the deployment of high capacity single-fiber and multi-fiber optical cables. Accordingly, cable routing costs per unit bandwidth constitute a diminishing portion of the cost of networking. Thus, bandwidth efficiency may be traded off for lower signal processing cost as well as improved reliability and autonomy of communications.

Also, with respect to the above-mentioned factor relating to network synchronization, it is desirable that any accessing and signaling arrangements in a high bandwidth environment allow the transmitters to be asynchronous with respect to each other; in addition, the arrangements should be tolerant of mild asynchronism between any transmitter and its intended receiver. These points are discussed in further detail in the paper entitled "Coding and Decoding for Code Division Multiple User Communications Systems", published in the *IEEE Transactions on Communications*, Vol. COM-33, No. 4, April, 1985.

SUMMARY OF THE INVENTION

The limitations and shortcomings of conventional networks, including LAN systems, are obviated in accordance with the present invention, by a system which accomplishes the transceiving function with a pattern of signals, generally pulses, distributed both in time as well as over at least one of the parallel paths interconnecting LAN users.

Broadly speaking, within the transmitter, the incoming data is partitioned into contiguous blocks and each block is encoded into a data frame for transmission over the one or more paths comprising the LAN interconnection medium. Frame encoding is effected by generating a two-dimensional array of pulses in correspondence to a given input block. One dimension of the array is time and the other is associated with a space dimension, namely, the one or more parallel paths. The dimensionality of the array is chosen to satisfy bit error rate requirements in the system.

Again, broadly speaking, the receiver is arranged as a correlation detector, that is, the receiver responds only to the particular two-dimensional pattern for which it is configured. Taps for extracting a portion of the propagating signals are coupled to the one or more parallel paths, at locations corresponding to the receiver space-time pattern, and these taps serve as inputs to the detector. In one realization of the present invention, each input is photo-detected and hardlimited by a photo-diode and the output of each photo-diode circuit, which may include amplification, serves as one input to an AND gate. An integrate-threshold detect-trigger cascade processes the output of the gate under control of synchronization circuitry. A threshold is exceeded only when the correct two-dimensional pattern for the receiver is propagating on the parallel paths. Other receiver implementations may be configured depending on the performance characteristics required in a deployed system.

One feature of the present invention is that a two-dimensional array or pattern exhibits more degrees of freedom than a pulse stream, so a lower bit error rate and lower false detection probability are achieved. Also, by exploiting optical processing as a decoding element, redundant coding among consecutive frames may become unnecessary in achieving the low error rate and low false detection probability in the presence of interference due to simultaneous transmissions of other users.

The organization and operation of this invention will be better understood from a consideration of the detailed description of the illustrative embodiments thereof, which follow, when taken in conjunction with the accompanying drawing.

DETAILED DESCRIPTION

As a starting point in elucidating the present invention, the well-known pulse position modulation (PPM) technique is first discussed. The description of an illustrative embodiment of a special case of the present invention may then be described using PPM concepts. The most general case of the present invention may then be couched in terms of the special case.

1. Pulse Position Modulation (Prior Art)

Figure 1:
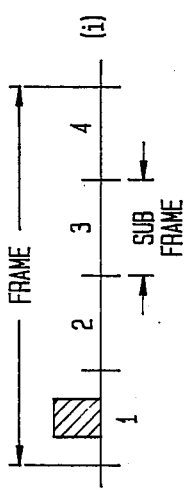
FIG. 1 depicts the well-known pulse-position modulation (PPM) encoding arrangement for communicating over a time-diversity channel.
Figure 1:
Figure 1:
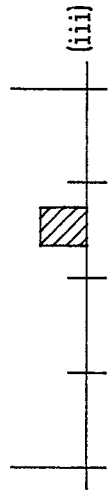
Figure 1:

In considering PPM, reference is made to FIG. 1. Transmitter-receiver communication is effected by sending a stream of contiguous frames over a channel which, for example, may be a coaxial cable or a fiber optic cable; one time period of a frame is shown in FIG. 1. Each frame is subdivided into a number S of subframes (S=4 in FIG. 1). In general, there are $2^S(2^4=16)$ combinations or ways to position pulses (shown shaded in FIG. 1) into the S subframes; this general scheme is the so-called pulse code modulation (PCM) scheme. However, for PPM, $2^S-S$ ($2^4-4=12$) combinations are disallowed, and only patterns exemplified by lines (i)–(iv) of FIG. 1 are utilized for transmission. Thus, for example: if the transmitter is to send the code word "00", a pulse is sent in subframe 1 (line (i)); if the code word is "01", then a pulse is sent in subframe 2 (line (ii)); and so forth. At the receiver, an error occurs if no pulse or more than one pulse is detected per frame. The constraint of one pulse per frame simplifies the receiver detection process.

2. Pattern Position Modulation

Figure 2:
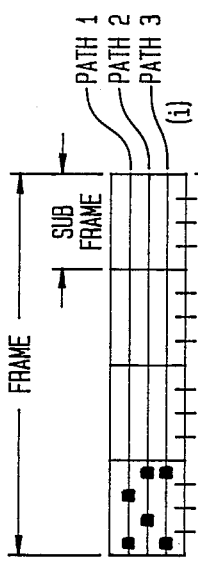
FIG. 2 depicts the pattern position modulation (PAPM) encoding arrangement in accordance with one aspect of the present invention wherein both space and time diversity are utilized for encoding channel frames.
Figure 2:
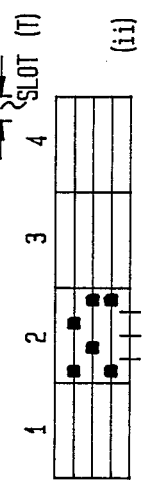
Figure 2:
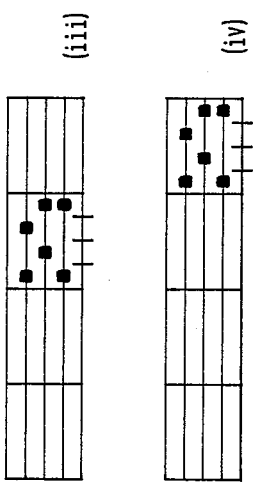
Figure 2:

One embodiment, called Pattern Position Modulation (PAPM), of the present invention is depicted in FIG. 2. Again, transmitter-receiver pairs communicate via a stream of contiguous frames, and each frame is partitioned into subframes. However, each subframe is further divided into R time slots (R=4 in FIG. 2), each of time duration T seconds. Moreover, as well as a time dimension (shown horizontally), a space dimension (shown vertically) is added by introducing a plurality of parallel communication paths (3 in FIG. 2). The type of time-space information that may be communicated in each subframe is exemplified by subframe 1 on line (i). The darkened square at the intersection of a time slot and a path position represents a transmitted pulse. For illustrative purposes, a pulse typically is centered in a time slot and is about T/2 seconds in duration. Each particular time-space pattern is called a signature. As analogous to PPM, only a selected signature may be sent per subframe. Thus, if the transmitter is to send code word "00", the given signature is sent in subframe 1 (line (i)); if the code word is "11", then the same signature is sent in subframe 4 (line (iv)); similar comments apply for subframes 2 and 3. In certain applications, it may occur that only one path interconnects a given transmitter-receiver pair. This is a special case of the more general case of two or more parallel interconnection paths. However, even this special case differs from the PPM case since a plurality of pulses are transmitted per subframe.

Figure 3:
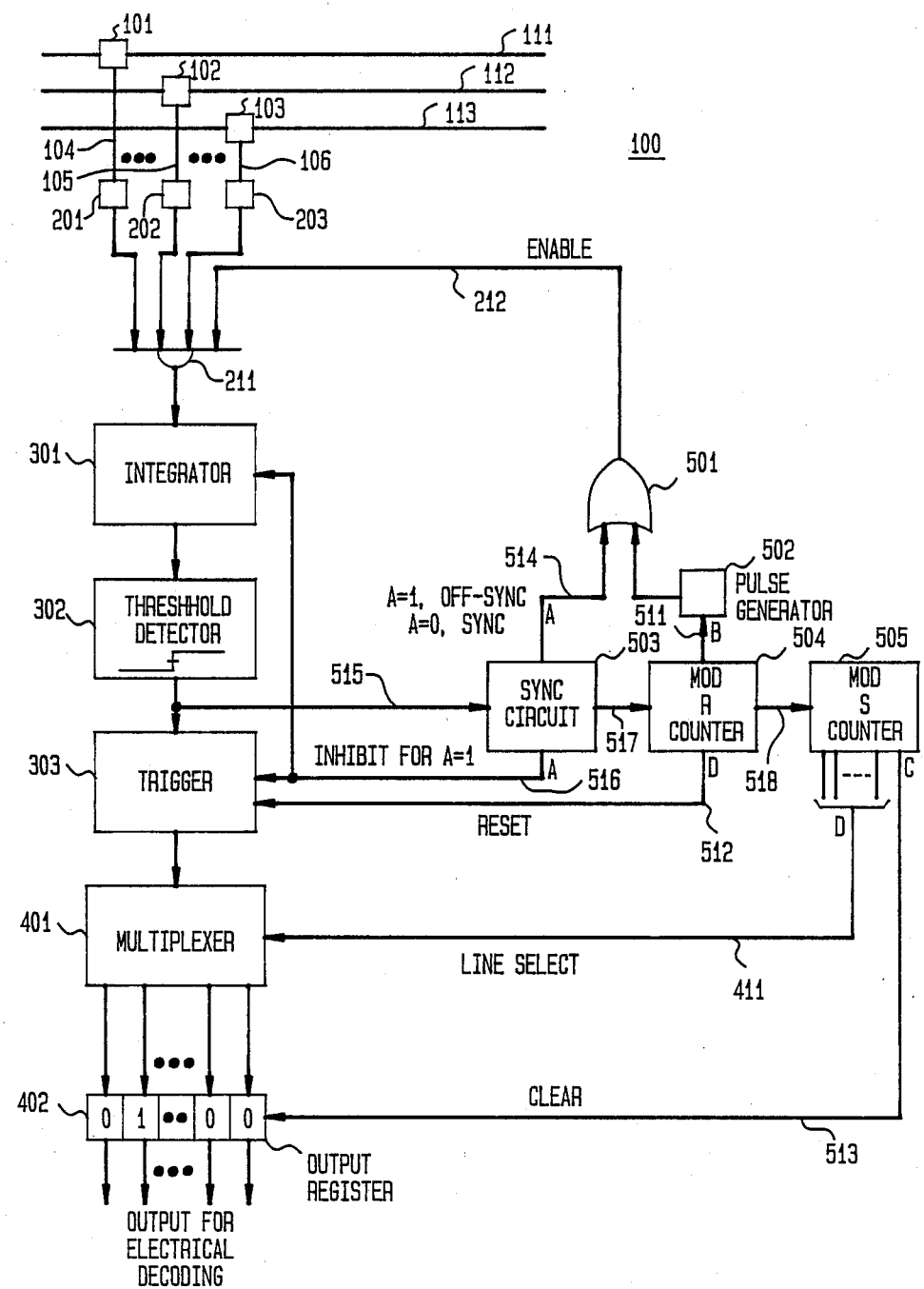
FIG. 3 is a diagram, partly in block form and partly in schematic form, depicting an illustrative optical correlator utilized to detect the PAPM frame of FIG. 2.

To detect the types of signatures exemplified by FIG. 2, correlator 100 depicted in FIG. 3 is utilized. The description that follows assumes that a particular transmitter-receiver pair is in synchronization. This is accomplished via the well-known technique of providing a "training" session prior to the transmission of any actual data; an exemplary training session will be discussed shortly.

Taps 101–103 on paths 111–113, respectively, are positioned according to the space-time distribution of the expected signature. For instance, for the signature of FIG. 2, tap 101 may actually represent two taps on the first path which are spaced apart 2T seconds in time, or in terms of electrical length, the distanced traveled by a pulse in 2T seconds. Fiber 104 then represents a two-fiber cable which provides two inputs to correlator 100. As an alternative, tap 101 may be a single tap providing energy to fiber 104 and then two taps (not shown) are placed along fiber 104 an electrical distance equivalent to the distance traveled by a pulse in 2T seconds. Similar comments apply to taps 102 and 103 as well as fibers 105 and 106. In either case, the lengths of fibers 104–106 may be adjusted to provide timing compensation. The taps feed corresponding optical photo-detectors 201–203 and the individual outputs of these photo-detectors serve as inputs to AND gate 211. Photo-detector 201, 202 or 203 may actually represent a plurality of photo-detectors depending on the number of taps coupled to paths 111, 112 or 113, respectively. A signature corresponding to the tap positions generates a logic 1 at the output of AND gate 211 for the duration of a pulse whenever ENABLE lead 212 is also a logic 1. Integrator 301 sums the output of AND gate 211 for a prescribed time period, typically T/2 seconds. If integrator 301 produces an output above a predetermined threshold during this time period, trigger circuit 303 is activated by threshold detector 302. The output of trigger 303 is directed by multiplexer 401, under control of the LINE SELECT lead 411, to the appropriate position in output register 402. For instance, if a "01" signature (line (ii) of FIG. 2) was transmitted, a logic 1 will be stored in the second register position from the left, as exemplified in FIG. 3. In general, whenever the i-th subframe is moving by correlator 100 on transmission paths 111–113, the result of the correlation, indicating the presence or absence of a signature, is stored at the i-th location in output register 402. For each frame, only one register position may have a logic 1; a false detection occurs if two or more positions each have a logic 1.

It is apparent that integrator 301 and trigger circuit 303 should be reset at the beginning of each subframe, and output register 402 must also be cleared at the beginning of each frame. These three operations, as well as generation of the ENABLE and LINE SELECT signals, are controlled by OR gate 501, pulse generator 502, sync circuit 503, Modulo-R counter 504 and Modulo-S counter 505. Sync circuit 503 includes a free-running clock which produces a stream of pulses at the system bit rate of 1/T. Lead 517 from circuit 503 provides clock pulses to counter 504 and, in turn, pulses from modulo-R counter 504 are received by counter 505 via lead 518. Modulo-R counter 504 sequences through decimal numbers 0,1,2, . . . ,R-2,R-1,0,1,2, . . . whereas counter 505 sequences through 0,1,2, . . . ,S-2,S-1,0,1,2 . . . . Modulo-R and Modulo-S counters 504 and 505 establish subframe and frame boundaries, respectively. Counter 504 outputs a logic 1 on leads 511 and 512 (output B) each time a decimal 0 is registered. Moreover, counter 505 outputs a logic 1 on lead 513 (output C) whenever counter 505 registers a decimal 0. Multiple lead 411 (output D) from counter 505 provides, typically, a binary signal representative of the decimal sequence generated by counter 505. This binary signal is used to control multiplexer 401. In addition, ENABLE lead 212 is "ON" for the duration of a pulse whenever the i-th subframe is processed by correlator 100, as controlled by the value of B on lead 511. Resetting of trigger 303 and integrator 301 and clearing of register 402 are controlled by signal outputs B and C on leads 512 and 513 from counters 504 and 505, respectively.

In discussing the detection process performed by correlator 100, it was assumed that the transmitter-receiver pair under consideration was in synchronism. The transmitter may "train" the receiver with the following illustrative technique. The transmitter sends N (e.g., N=5) training frames during the training session. A frame has S subframes, but instead of transmitting a signature in only one of the subframes, a training frame transmits a signature in each of the first Q (e.g., 3) subframes, and no signatures for the rest of the frame. For convenience, this is called a Q-pattern. During training, ENABLE lead 212 is "ON" continuously, that is, output A from sync circuit 503 emits a logic 1 on lead 514. Also, sync circuit 503 receives its input from detector 302 via lead 515. In addition, counters 504 and 505 are inhibited during training.

The detection of the first signature in a Q-pattern by correlator 100 starts both a subframe clock and a frame clock running and increments a counter to 1 (the clocks and counter, not shown, comprise sync circuit 503). If the next signature arrives within the time interval (RT-t,RT+t) as measured on the subframe clock, where t allows for an some variation about the time duration RT of a subframe, the counter is incremented and the subframe clock is restarted. Any correlation arriving after RT+t with the counter registering less than Q indicates a failure to detect a Q-pattern. Then the clocks and counter are reinitialized.

Whenever a Q-pattern is recognized, the frame clock provides an estimate to the frame starting time and frame duration. Moreover, the Q subframe clock times may be averaged to obtain an estimate of the subframe duration which, as indicated, may differ from the nominal value of RT seconds. In addition, since the Q-pattern is sent over several consecutive frames, an average of the frame clock times may be utilized to more accurately estimate the frame period.

There are occasions when the training session fail or gives inaccurate values for the frame starting time, due to interference from other transmitter-receiver pairs. In these situations, the duration of the ENABLE signal on lead 212 may be extended to more than the pulse duration, according to the accuracy of the estimate for the frame starting time.

During the training session, with reference to FIG. 3, output signal A from sync circuit 503 on leads 514 and 516 is at a logic 1 level The signal on lead 514 provides the continuous ENABLE signal, as discussed above, whereas the signal on lead 516 inhibits trigger circuit 303 to preclude false detections during training. After training, output A is set to logic 0, sync circuit 503 drives R counter 504 on lead 517, and R counter 504 drives S counter 505 on lead 518.

Figure 4:
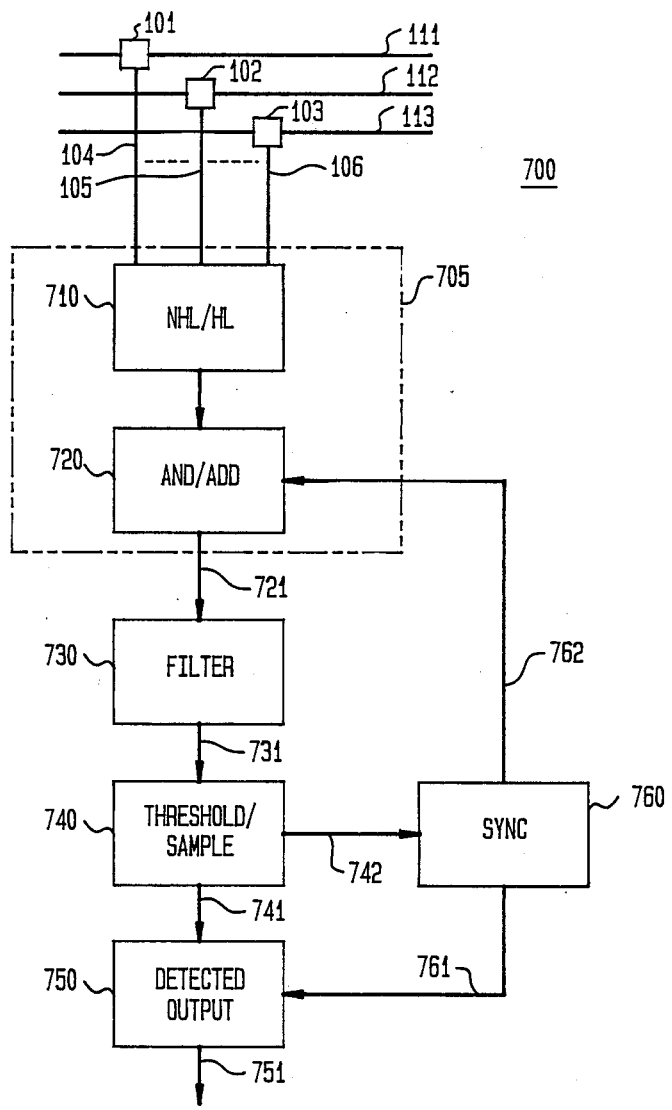
FIG. 4 depicts, in block diagram form, a generalized detector for pattern coded signals.

Optical correlator 100 of FIG. 3 is one implementation of a more general receiver for detecting PAPM. FIG. 4 depicts, in block diagram form, the elements of a general PAPM receiver 700. As in FIG. 3, taps 101–103 divert a portion of the energy of the information signals propagating on paths 111–113, respectively, to leads 104–106 and these tapped signals serve as inputs to receiver 700. Element 710 represents means for detecting the tapped signals whereas element 720, directly coupled to the output of element 710, represents means for combining the energy of detected versions of the tapped signals. Both elements 710 and 720 comprise components of one version of front-end processor 705, shown dashed in FIG. 4.

Detection by element 710 may be effected in a hardlimited (HL) mode or in a non-hardlimited (NHL) mode; these modes are labeled within element 710 of FIG. 4. For instance, photo-diodes 201–203 of FIG. 3, used to detect the signals derived from taps 101–103, generally provide hardlimiting to these signals, that is, the output signal from each photo-diode is constant whenever its input signal is above a threshold. Element 720 may either add (ADD) or simultaneously detect (AND) the signals from element 710; these processes are labeled within element 720. Again, with reference to FIG. 3, AND gate 211 is a particular realization of the AND processing of element 720. Thus, the front-end processing performed by elements 201–203 and element 211 of FIG. 3 may be conveniently summarized by the notation "HL/AND".

Figure 5:
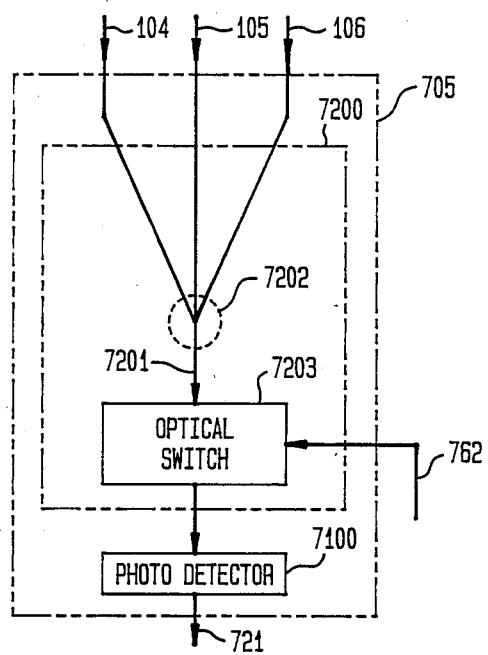
FIG. 5 depicts, in block diagram form, a variation on the front-end processor depicted in FIG. 4.
Figure 6:
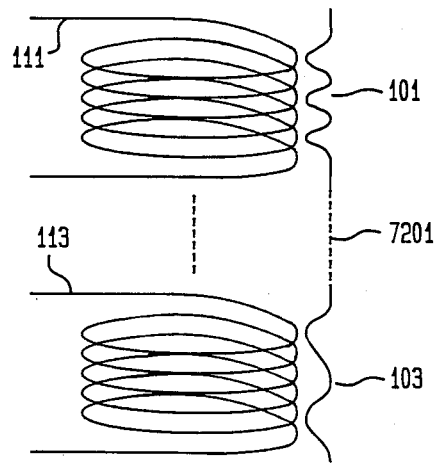
FIG. 6 illustrates a technique for the combined operations of tapping and simultaneously combining signal energy from the main optical fiber paths.

Another version of front-end processor 705 is shown in FIG. 5. In this realization, the signals on leads 104–106 are simultaneously focused onto another optical fiber 7201 at focal point 7202. In this manner, the signal energy is summed or added before detection by photo-detector 7100, typically a photo-diode. Optical switch 7203, interposed between fiber 7201 and detector 7100, serves to couple the output of fiber 7201 to detector 7100 at synchronized intervals. This sync signal is provided by sync circuit 760 on lead 762 (see FIG. 4). Fiber 7201 and switch 7203 comprise components of element 7200, which basically performs an ADD operation. Accordingly, processor 705 of FIG. 5 may be summarized by the "ADD/HL" notation FIG. 6 depicts another arrangement for the combined operations of tapping from paths 111–113 and the simultaneous summing of signal energy from these taps. Fiber 7201 is loosely coupled, say by intertwining, to fibers 111–113 so that only a fraction of the energy tapped from a path is returned to another path by fiber 7201.

With reference again to FIG. 4, front-end processing element 705 is coupled to filter element 730 via lead 721. Filter 730 may be realized with different filter shapes depending on the choice of the other elements in receiver 700. For instance, in FIG. 3, filter 730 is configured as integrator 301. Other options for filter 730 include: filtering with a circuit having an impulse response $h(t)$; or no filtering. These various options are designated, respectively, by: INT t (integrate for past period t, t normalized with respect to the duration T of a pulse); $h(t)$; and NF.

Element 740 receives its input from element 730 on lead 731. Element 740 may be realized, for example, as a threshold detector or sample-and-hold circuit, depending on the realization of other elements in receiver 700 These two options are designated TD-Th (Th is a threshold, generally normalized by the amplitude of the correlation peak of a noiseless signature) and S-H. In FIG. 3, threshold device 302 realizes element 740.

Element 760 represents the synchronization and ENABLE operations required for overall system communication; element 760 is coupled to element 740 via lead 742. The ENABLE operation is designated EN E (the duration of an ENABLE signal E normalized to the duration T of a pulse). In FIG. 3, the ENABLE operation is performed by devices 501 and 503. Also, the synchronization operation is performed by devices 501–505. Element 760 provides appropriate ENABLE and synchronizing signals to processor 705 and output element 750 via leads 762 and 761, respectively.

Output element 750 receives its input from element 740, via lead 741, and from element 760, via lead 761. In FIG. 3, output element 750 is implemented basically by devices 303, 401 and 402. Element 750 provides the output signal from receiver 700, generally in a form that requires decoding, on lead 751. Without loss of generality, decoding may also be effected in output element 750 so that lead 751 provides the decoded output signals.

With the notation defined above for the individual elements, the correlation receiver 100 of FIG. 3 may be designated "HL/AND/INT 1/1/1". In comparing the performance and structure of configurations represented by receiver 700, it is said that any two configurations are equivalent if both give the same set of detected patterns for all channel waveforms. For instance, since an AND gate essentially hardlimits its input, it can be readily seen that

"NHL/AND/INT 1/1/1"="HL/AND/INT 1/1/1".

Other combinations are also possible; for instance:

"NHL/AND/INT t/1/1"="HL/AND/INT t/1/1", or

"NHL/AND/h(t)/S-H/EN E"="HL/AND/h(t)/S-H/EN E".

Figure 7:
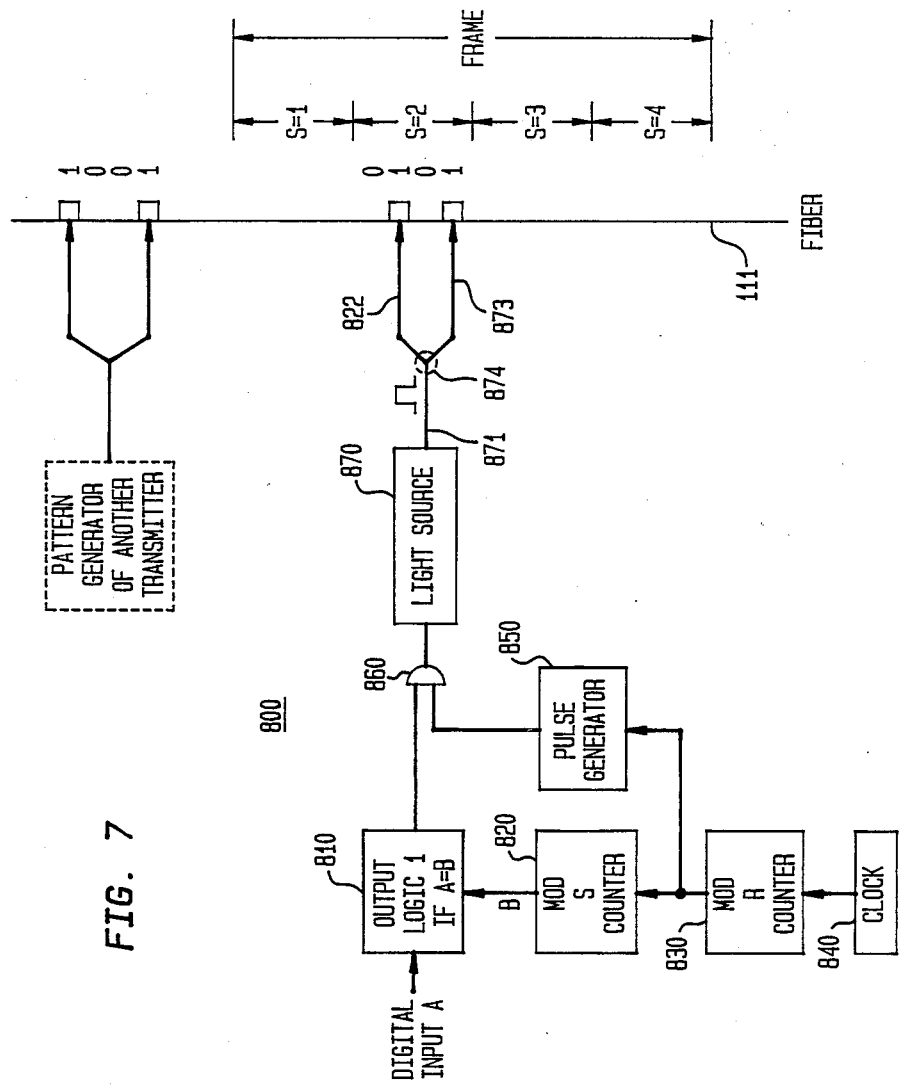
FIG. 7 is a diagram, partly in block form and partly in schematic form, depicting an illustrative transmitter utilized to encode frames of a PAPM signal.

In order to propagate the types of signatures exemplified by FIG. 2 onto, for instance, paths 111, 112 or 113 of FIG. 3, transmitter 800 depicted in block diagram form in FIG. 7 may be utilized. Clock 840 is free-running and outputs a pulse stream at the rate (1/T) at which bits are propagated over, say, path 111 (e.g., a one nano-second clock pulse for a 1 gigabit/sec. system). Modulo-R counter 830 is driven by clock 840, and the output of counter 830 serves as inputs to both Modulo-S counter 820 and pulse generator 850. Counter 830 sequences, in synchronism with clock 840, through decimal numbers 0,1,2, . . . ,R-2,R-1,0,1,2, . . . . For example, with R=4, counter 830 produces the numbers 0,1,2,3,0,1,2 for the first through seventh pulses from clock 840. Pulse generator 850 outputs a pulse to AND gate 860 whenever the output from counter 830 is a decimal 0.

Modulo-S counter 820 sequences, in synchronism with counter 830, through decimal numbers 0,1,2, . . . ,S-2,S-1,0,1,2, . . . . For example, with S=4, counter 820 produces the numbers 0,1,2,3,0,1,2 for the first through seventh pulses from counter 830.

Logic device 810 has the output (designated B) from counter 820 as one input and the other input is the digital data (designated A) from the source (not shown) that is to be encoded for transmission. Device 810 emits a logic 1 whenever signal A equals signal B. For instance, from FIG. 2, the decimal equivalent of the digital data on line (ii) is decimal 1 (binary 01), so A=1, and this data signal is present at the input to device 810 for a complete frame When B becomes one during the frame (the fifth clock pulse from the start of the frame), logic 1 levels are emitted from logic device 810 and generator 850, so AND gate 860 is activated and, in turn, light source 870 is energized. A pulse at the system bit rate is propagated onto fiber 871 emanating from source 870. The light energy is split at junction 874 and is coupled onto fibers 872 and 873. For the signature depicted on fiber 111 in FIG. 7, namely, '0101' in subframe 2, the taps coupling energy to fiber 111 from fibers 872 and 873 are spaced apart 2T seconds. The lengths of fibers 872 and 873, ideally equal, may be adjusted to insure an electrical spacing equivalent to the distance a pulse travels in 2T seconds.

Clock 840 in FIG. 7 and the system clock comprising sync circuit 503 in FIG. 3 have been presumed to be free-running at the rate 1/T. The system clock of sync circuit 503 may be adjusted to correspond to clock 840 as a result of the training session or, as an alternative, a frequency-locked loop (FLL) may be incorporated as part of sync circuit 503. The use of a FLL to compensate for different clock rates is well-known in the art.

With the descriptions of the interplay between the illustrative electro-optical circuitry of FIGS. 3 and 7, it is clear that each arrangement comprising transmitter 800 and receiver 300 perform the combined operation best described as transceiving. Communication is effected as long as each transceiving pair utilizes a unique signature.

3. Pattern Code Modulation

Figure 8:
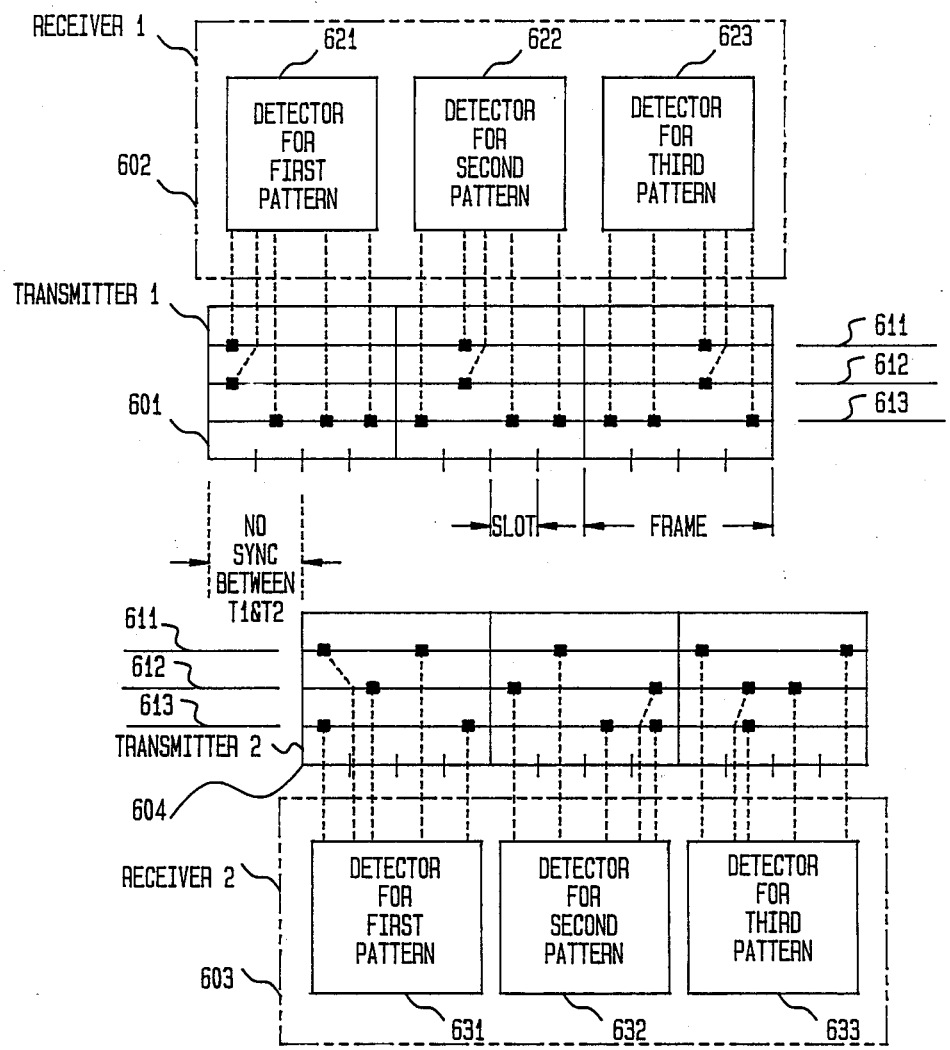
FIG. 8 depicts two transmitter-receiver pairs arranged to communicate via pattern code modulation (PACM) and demonstrates yet another aspect of the present invention.

The most general transmitter-receiver arrangement in accordance with the present invention, called Pattern Code Modulation (PACM), is discussed with reference to FIG. 8. Again, messages are transmitted by a contiguous stream of frames. However, frames are only partitioned into time slots, not subframes, as in the PAPM case. This is depicted on the horizontal axis for block 601, which represents the encoded signal emitted from TRANSMITTER 1. Each transmitter in the communication system has a distinct set of patterns; each pattern is distributed over the paths 611–613 and the frame. Again, the darkened square at the intersection of a time slot and a path position represents a transmitted pulse.

A transmitter sends one of the patterns from its set in each frame. For instance, the pattern in the first frame emitted by TRANSMITTER 1 may represent a "00" code word generated within transmitter element 601. Similarly, 10 the pattern in the first frame of transmitter element 604 may also represent a "00" code word in TRANSMITTER 2. The patterns generally differ even though the same data block is used to generate the patterns within the various transmitters. Again, a special case exists wherein the transmitter-receiver pairs may be connected by only one path. The NxM two-dimensional array (N is time, M is space) reduces to a simple Nxl array.

A receiver is configured to detect each of the patterns generated by its corresponding transmitter or transmitters. For instance, receiver element 602 has three different optical correlators 621–623, of the type shown in FIG. 3, to detect the three exemplary patterns broadcast by TRANSMITTER 1. Similarly, receiver element 603 includes three different optical correlators 631-633 to detect the patterns broadcast by TRANSMITTER 2. In FIG. 8, correlator 621 is shown as detecting the first frame, correlator 622 the second frame and correlator 623 the third frame. However, all correlators are connected to all paths 611-613 at all times; only the one detecting a peak correlation in each frame is depicted for that frame in FIG. 8.

It should be recognized that transmitter and receivers are generally arranged in pairs (although a broadcast mode may be desirable in some instances, that is, all receivers are configured to accept the same patterns). Only a corresponding transmitter-receiver pair must maintain synchronization. It is not necessary to maintain synchronization among transmitters. Thus, the number of independent communication channels equals the number of communicating pairs connected to the paths, and this number is typically significantly more than the actual number of paths.

Transmitter 601 or 604 may be realized in a manner similar to FIG. 7 for each required pattern (since there are no subframes in PAPM, a subframe counter is not required). Also, each detector 612-623 or 631-633 may be realized in a manner similar to FIG. 3 for each pattern assigned to receiver element 602 or 603, respectively.

It is to be further understood that the pattern transmitters and receivers, including associated methodologies, described herein are not limited to specific forms disclosed by way of example and illustration, but may assume other embodiments limited only by the scope of the appended claims.

What is claimed is:

1. A method for communicating information between a transmitter and a receiver as an information frame transmitted in a time interval corresponding to a given rate comprising the steps of
    interconnecting said transmitter and said receiver with a plurality of parallel communication paths, and
    transceiving on said paths an electrical pattern in said frame wherein said pattern is composed of a plurality of signals distributed over said paths and distributed in time at sub-intervals of said interval and wherein each arrangement of said signals in said frame corresponds to a unique code word identifying said information.

2. A method for communicating information between a transmitter and a receiver as an information frame transmitted at a given rate comprising the steps of
    interconnecting said transmitter and said receiver with a plurality of parallel communication paths, and
    transceiving on said paths an electrical pattern in said frame wherein said pattern is composed of a plurality of signals distributed over said paths and distributed in time at sub-intervals corresponding to said rate and wherein each arrangement of said signals in said frame corresponds to a unique code word identifying said information and such that said pattern is fixed as a single signature composed of a distinct arrangement of said signals, and the step of transceiving comprises the steps of
    subdividing said frame into subframes corresponding to said sub-intervals, and
    transmitting by said transmitter and then receiving by said receiver said signature during one of said subframes selected according to said information such that the relative position of said one of said subframes in said frame identifies said unique code word.

3. A method for exchanging an information frame transmitted in a time interval corresponding to a given rate between a transmitter and a receiver comprising the steps of
    interconnecting said transmitter and said receiver with a plurality of parallel communication paths, and
    transceiving on said paths an electrical pattern in said frame corresponding to said information, said pattern comprising a plurality of pulses distributed over said paths and distributed in time at sub-intervals of the time duration of said interval and wherein each arrangement of said pulses in said frame corresponds to a unique code word identifying said information.

4. A method for exchanging an information frame between a transmitter and a receiver comprising the steps of
    interconnecting said transmitter and said receiver with a plurality of parallel communication paths,
    subdividing said frame into subframes, and
    transceiving on said paths a fixed signal in one of said subframes as determined by said information, said fixed signal comprising a plurality of pulses distributed over said paths and distributed in time at sub-intervals of the time duration of said one of said subframes so that the relative position of said one of said subframes in said frame corresponds to a unique code word identifying said information.

5. A method for communicating continuous information frames each transmitted in a time interval corresponding to a given rate between a transmitter and a receiver comprising the steps of
    interconnecting said transmitter and said receiver with a plurality of communication paths, and
    transceiving over said paths in each of said frames a preselected signal pattern corresponding to the information in each of said frames, said pattern comprising a plurality of pulses distributed over said paths and distributed in time at sub-intervals of said interval and wherein each arrangement of said pulses in each of said frames corresponds to a unique code word identifying said information.

6. A method for communicating continuous information frames between a transmitter and a receiver comprising the steps of
    interconnecting said transmitter and said receiver with a plurality of communication paths, and
    transceiving over said paths in each of said frames a preselected signal pattern corresponding to the information in each of said frames, said pattern comprising a plurality of pulses distributed over said paths and distributed in time at sub-intervals of the frame rate and wherein each arrangement of said pulses in each of said frames corresponds to a unique code word identifying said information and such that said pattern is fixed as a single signature and the step of transceiving comprises the steps of
    subdividing each of said frames into subframes corresponding to said sub-intervals, and
    transmitting by said transmitter and then receiving by said receiver said signature during one of said subframes in correspondence to said information in each of said frames such that the relative position of said one of said subframes in said each of said frames 7. A method for encoding incoming data as a series of frames for transmission at prescribed intervals over a plurality of parallel communication paths comprising the steps of
partitioning said incoming data and associating each said partition with one of said frames, and
generating during each of said frames a signal pattern from a preselected set, said pattern selected in correspondence to said data in said each of said frames and comprising a plurality of pulses distributed over said paths and distributed in time at sub-intervals of the corresponding one of said intervals, and wherein each pattern in said set corresponds to a unique code word identifying said partitioned data and each arrangement of said pulses in said frame identifies said code word.

8. A method for encoding incoming data as a series of frames for transmission at prescribed intervals over a plurality of parallel communication paths comprising the steps of
partitioning said incoming data and associating each said partition with one of said frames, and
generating during each of said frames a signal pattern from a preselected set, said pattern selected in correspondence to said data in said each of said frames and comprising a plurality of pulses distributed over said paths and distributed in time at sub-intervals of the corresponding one of said intervals, and wherein each pattern in said set corresponds to a unique code word identifying said partitioned data and each arrangement of said pulses in said frame identifies said code word and such that said set contains a single pattern called a signature, and said step of generating further comprises the steps of
subdividing each of said frames into subframes corresponding to said sub-intervals, and
generating said signature during one of said subframes in each of said frames as determined by said partitioned data in each of said frames such that the relative position of said one of said subframes in each of said frames determines said code word.

9. A method for decoding a pattern coded signal conveying a frame of information, said signal composed of a plurality of pulses distributed over a plurality of parallel communication paths and distributed in time at sub-intervals corresponding to the transmission rate of said frame and wherein each arrangement of said pulses in said frame corresponds to a unique code word identifying said information, said method comprising the steps of
arranging a sensor array in energy transfer relation to said paths at detection points corresponding to said time sub-intervals and distribution over said paths, and
processing the output of said sensor array to produce a correlation signal whenever said pattern coded signal is present on said paths during a time interval corresponding to said rate.

10. The method as recited in claim 9 wherein said step of processing further includes the step of enabling said sensor array for a preselected one of said sub-intervals during each of said intervals.

11. The method as recited in claim 9 wherein the step of arranging a sensor array in energy transfer relation comprises the step of coupling energy detectors to said paths at said detection points.

12. The method as recited in claim 9 wherein said paths comprise a fiber optic cable arrangement,
wherein said step of arranging a sensor array in energy transfer relation to said paths includes the steps of
tapping electro-optical energy from said cable arrangement at said detection points, and
feeding said electro-optical energy to a photo-detector arrangement to provide a received signal at said output of said sensor array, and
wherein said step of processing includes the steps of
filtering said received signal for a preselected one of said sub-intervals during each of said intervals to produce a filtered signal,
threshold detecting said filtered signal to produce a threshold signal, and
generating said correlation signal whenever said threshold signal is above a predetermined threshold.

13. Circuitry for decoding a pattern coded signal conveying a frame of information, said signal comprising a plurality of pulses distributed over a plurality of parallel communication paths and distributed in time at sub-intervals corresponding to the transmission rate of said frame and wherein each arrangement of said pulses in said frames corresponds to a unique code word identifying said information, said circuitry comprising
means, in energy transfer relation to said paths at detection points corresponding to said time subintervals and said distribution over said paths, for sensing on said paths an array of sensed signals, and
means, coupled to said means for sensing, for processing said sensed signals and for providing a correlation signal whenever said pattern coded signal is present on said paths during a time interval corresponding to said rate.

14. Circuitry as recited in claim 13 wherein said paths include a first fiber optic cable arrangement and said means for sensing includes a second fiber optic cable arrangement wherein each cable in said second arrangement is coupled to a corresponding cable in said first arrangement, each of the coupled arrangements producing one of said sensed signals.

15. In combination, a plurality of optical communication paths,
a source of light pulses,
means responsive to input information for causing said source to generate a pattern of light pulses in a predetermined time frame, said pattern including a plurality of pulses having space diversity for distribution over said paths and time diversity for distribution in time at sub-intervals of said time frame and wherein each arrangement of said pulses in said frame corresponds to a unique code word identifying information conveyed by said frame, and
means for distributing said pattern to a unique combination of said communication paths according to space diversity at times according to said time diversity.

16. In combination, a plurality of optical communication paths,
a source of light pulses,
means responsive to input information for causing said source to generate a pattern of light pulses in a predetermined time frame, said pattern including a plurality of pulses having space diversity for distribution over said paths and time diversity for distribution in time at sub-intervals corresponding to said frame rate and wherein each arrangement of said pulses in said frame corresponds to a unique code word identifying information conveyed by said frame, and means for distributing said pattern to a unique combination of said communication paths according to space diversity at times according to said time diversity and such that said means for distributing includes means for subdividing said frame into subframes corresponding to said sub-intervals and for transmitting said pattern during one of said subframes selected according to said input information such that the relative position of said one of said subframes in said frame determines said unique code word.

* * * * *

UNITED STATES PATENT AND TRADEMARK OFFICE
CERTIFICATE OF CORRECTION

PATENT NO. : 4,918,689

DATED : April 17, 1990

INVENTOR(S) : Yu N. Hui

It is certified that error appears in the above-identified patent and that said Letters Patent is hereby corrected as shown below:

Column 8, line 54, eliminate the number "10".

Column 11, line 2, after "said frames" insert --identifies said unique code word.--.

Signed and Sealed this

Twenty-second Day of December, 1992

Attest:

DOUGLAS B. COMER

Attesting Officer   Acting Commissioner of Patents and Trademarks